United States Patent
Golitschek et al.

(10) Patent No.: US 7,697,565 B2
(45) Date of Patent: Apr. 13, 2010

(54) DATA TRANSMISSION APPARATUS AND COMMUNICATION SYSTEM USING A CONSTELLATION REARRANGEMENT

(75) Inventors: Alexander Golitschek, Langen (DE); Christian Wengerter, Langen (DE); Michael Philipp Schmitt, Langen (DE); Eiko Seidel, Langen (DE)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/759,892

(22) Filed: Jun. 7, 2007

(65) Prior Publication Data

US 2007/0230613 A1    Oct. 4, 2007

Related U.S. Application Data

(63) Continuation of application No. 11/003,437, filed on Dec. 6, 2004, which is a continuation of application No. 10/239,794, filed as application No. PCT/EP01/01982 on Feb. 21, 2002, now Pat. No. 6,892,341.

(51) Int. Cl.
    *H04J 3/16*    (2006.01)
    *H04J 3/22*    (2006.01)

(52) U.S. Cl. .................................... 370/465

(58) Field of Classification Search ............... 714/748, 714/774; 370/465
    See application file for complete search history.

(56) References Cited

U.S. PATENT DOCUMENTS 4,344,171 A     8/1982   Lin et al.
4,494,239 A *   1/1985   Martin ...................... 375/261
4,495,619 A     1/1985   Acampora
4,523,323 A     6/1985   Nakajima
4,780,883 A    10/1988   O'Connor et al.
4,866,395 A     9/1989   Hostetter
4,937,844 A     6/1990   Kao
5,134,635 A     7/1992   Hong et al.
5,377,194 A    12/1994   Calderbank
5,396,518 A     3/1995   How
5,428,643 A     6/1995   Razzell
5,519,356 A     5/1996   Greenberg
5,524,025 A     6/1996   Lawrence et al.
5,822,371 A    10/1998   Goldstein
5,831,561 A    11/1998   Cai et al.

(Continued)

FOREIGN PATENT DOCUMENTS

CN          1411236      4/2003

(Continued)

OTHER PUBLICATIONS

M. P. Schmitt; "Improved Retransmission Strategy for Hybrid ARQ Scheme Employing TCM", IEEE 1999, pp. 1226-1228.*

(Continued)

*Primary Examiner*—Joseph D Torres
(74) *Attorney, Agent, or Firm*—Dickinson Wright PLLC (57) ABSTRACT

A transmission apparatus for transmitting data has a table that includes a plurality of constellation versions for a 64 QAM modulation scheme. Each of the constellation versions defines at least one of (i) bit positions in a bit sequence and (ii) logical values of bits of the bit sequence. A transmission section transmits data using one of the constellation versions based on the table.

7 Claims, 9 Drawing Sheets

U.S. PATENT DOCUMENTS

| | | | |
|---|---|---|---|
| 5,914,959 A | 6/1999 | Marchetto et al. | |
| 5,953,376 A | 9/1999 | Wei | |
| 5,966,412 A * | 10/1999 | Ramaswamy | 375/341 |
| 6,126,310 A | 10/2000 | Osthoff et al. | |
| 6,134,694 A | 10/2000 | Uebayashi et al. | |
| 6,138,260 A | 10/2000 | Ketseoglou | |
| 6,233,254 B1 | 5/2001 | Myers | |
| 6,233,712 B1 * | 5/2001 | Rhee et al. | 714/789 |
| 6,247,150 B1 | 6/2001 | Niemela | |
| 6,311,306 B1 | 10/2001 | White et al. | |
| 6,347,125 B1 | 2/2002 | Dent | |
| 6,463,106 B1 | 10/2002 | Prasanna | |
| 6,473,878 B1 | 10/2002 | Wei | |
| 6,476,734 B2 | 11/2002 | Jeong et al. | |
| 6,536,010 B1 * | 3/2003 | Brink | 714/794 |
| 6,567,475 B1 | 5/2003 | Dent et al. | |
| 6,584,190 B1 | 6/2003 | Bressler | |
| 6,606,355 B1 | 8/2003 | Wei | |
| 6,625,165 B1 | 9/2003 | Krishnamoorthy et al. | |
| 6,647,069 B1 | 11/2003 | Segal et al. | |
| 6,738,370 B2 | 5/2004 | Ostman | |
| 6,765,926 B1 | 7/2004 | Price et al. | |
| 6,769,085 B2 * | 7/2004 | Von Elbwart et al. | 714/748 |
| 6,798,846 B2 * | 9/2004 | Golitschek et al. | 375/298 |
| 6,892,341 B2 * | 5/2005 | Golitschek et al. | 714/748 |
| 7,003,050 B2 | 2/2006 | Matsumoto et al. | |
| 7,110,470 B2 * | 9/2006 | Von Elbwart et al. | 375/298 |
| 7,111,219 B2 * | 9/2006 | Golitschek et al. | 714/748 |
| 2005/0097424 A1 | 5/2005 | Golitschek et al. | |

FOREIGN PATENT DOCUMENTS

| | | |
|---|---|---|
| DE | 19705354 | 8/1998 |
| EP | 0938207 | 8/1999 |
| EP | 1043858 A1 | 10/2000 |
| EP | 1447935 | 8/2004 |
| JP | 64055942 | 3/1989 |
| JP | 02312338 | 12/1990 |
| JP | 03274933 | 12/1991 |
| JP | 06006399 | 1/1994 |
| JP | 6252971 | 9/1994 |
| JP | 738448 | 2/1995 |
| JP | 07143185 | 6/1995 |
| JP | 879325 | 3/1996 |
| JP | 08065279 | 3/1996 |
| JP | 9-083600 | 3/1997 |
| JP | 09307517 | 11/1997 |
| JP | 11177648 | 7/1999 |
| JP | 2000188609 | 7/2000 |
| JP | 2000201132 | 7/2000 |
| WO | 9959269 | 11/1999 |
| WO | 03019794 | 3/2003 |

OTHER PUBLICATIONS

Stephen B. Wicker, Error Control Systems for Digital Communication and Storage, Prentice-Hall, 1995, p. 359.*

M. Isaka, et al., "On the design of bit-interleaved coded modulation with Turbo codes", Institute of Industrial Science, The University of Tokyo, 1999, p. 311.

M. P. Schmitt, "Hybrid ARQ Scheme Employing TCM and Packet Combining", Electronics Letters, vol. 34, No. 18, Sep. 3, 1998, pp. 1725-1726.

K. Narayanan et al., "A Novel ARQ Technique using the Turbo Coding Principle", IEEE Communications Letter, IEEE Service Center, vol. 1, No. 2, Mar. 1, 1997, pp. 49-51, XP000687091.

C. Berrou, et al.; "Near Shannon Limit Error-Correcting Coding and Decoding:Turbo-Codes(1)", IEEE 1993, pp. 1064-1070.

S. Le Goff, et al.; "Turbo-Codes and High Spectral Efficiency Modulation", Telecom Bretagne, France Telecom University, IEEE 1994, pp. 645-649.

A. Burr; Modulation and Coding for Wireless Communications, Pearson Education, Prentice Hall, pp. 133-315.

"Enhanced HARQ Method with Signal Constellation Rearrangement" TSG-RAN Working Group 1 Meeting #19, Las Vegas, USA, Feb. 27-Mar. 2, 2001, Panasonic, AH24 (HSDPA), XP-002229383 pp. 1-11.

6.8 Hybrid ARQ (H-ARQ), H-ARQ with Full IR (H-ARQ-Type-II), 3G TR25.848 V0.6.0 (May 2000), TSG-RAN Working Group 1 meeting #19 Las Vegas, USA, Feb. 27-Mar. 2, 2001, pp. 30-45.

S. Lin, et al.; "A Hyrbid ARQ Scheme with Parity Retransmission for Error Control of Satellite Channels," IEEE Transactions on Communications, vol. com-30, No. 7, Jul. 1982, pp. 1701-1719.

Japanese Office Action dated Oct. 14, 2003 with English Translation related to U.S. Appl. No. 10/182,569.

US Office Action dated Jan. 12, 2004 in U.S. Appl. No. 10/295,899.

US Office Action dated Dec. 8, 2003 in U.S. Appl. No. 10/298,207.

International Search Report dated Jan. 29, 2002.

European Search Report dated May 31, 2002 related to U.S. Appl. No. 10/295,899.

European Search Report dated May 31, 2002 related to U.S. Appl. No. 10/298,207.

U.S. Appl. No. 10/182,569.

U.S. Appl. No. 10/295,899.

U.S. Appl. No. 10/298,207.

S. Kallel; "Analysis of a Type II Hybrid ARQ Scheme with Code Combining", IEEE Transactions on Communications, vol. 38, No. 8, Aug. 1990, pp. 1133-1137.

S. Kallel, et al.; "Throughput Performance of Memory ARQ Schemes", IEEE Transactions on Vehicular Technology, vol. 48, No. 3, May 1999, pp. 891-899.

D. Chase; "Code Combining-A Maximum-Likelihood Decoding Approach for Combining an Arbitrary Number of Noisy Packets", IEEE Transactions on Communications, vol. comm.-33, No. 5, May 1985, pp. 385-393.

B.A. Harvey, et al.; "Packet Combining Systems Based on the Viterbi Decoder", IEEE Transactions on Communications, vol. 42, No. 2/3/4, Feb./Mar./Apr. 1994, pp. 1544-1557.

M. P. Schmitt; "Improved Retransmission Strategy for Hybrid ARQ Schemes Employing TCM", IEEE 1999, pp. 1226-1228.

International Search Report dated Oct. 16, 2001.

Schmitt, M.P.; Hybrid ARQ scheme employing TCM and packet combining, Electronics Letters, vol. 34, Issue: 18, Sep. 3, 1998 pp. 1725-1726.

European Search Report dated Oct. 14, 2004.

Indian Office Action dated Nov. 3, 2004.

Korean Office Action dated Jan. 15, 2005.

M. Morimoto, et al., "A Hierarchical Image Transmission System for Multimedia Mobile Communication," First International Workshop on Wireless Image/Video Communications, IEEE COMSOC, EURASIP, Department of Communications Engineering, Faculty of Engineering, Osaka University, Osaka, Japan, pp. 80-84, Sep. 1996.

M. Morimoto, et al., "A Hierarchical Image Tranmission System in a Fading Channel," Department of Electrical Engineering, Faculty of Engineering, Osaka, Japan, IEEE, pp. 769-772, Nov. 1995.

Office Action dated Aug. 30, 2005 in U.S. Appl. No. 10/853,266.

European Office Action dated Sep. 5, 2005.

European Office Action dated Sep. 6, 2005.

Chinese Office Action dated Jan. 20, 2006 with English translation.

Chinese Office Action dated Feb. 10, 2006 with English translation.

"ARQ Error Control Techniques," TSG-RAN Working Group 2 (Radio layer 2 and Radio layer3), TSGR2#2(99)085, Stockholm, pp. 1-5, Mar. 8-11, 1999.

US Office Action dated Aug. 22, 2005 in U.S. Appl. No. 11/003,437.

US Office Action dated Feb. 14, 2006 in U.S. Appl. No. 11/003,437.

Japanese Office Action dated Nov. 17, 2009 with English translation thereof.

* cited by examiner $i_1$ $i_2$ | $i_2$ $q_2$ 
1011 1001 | 0001 0011
● ● | ● ●

DATA TRANSMISSION APPARATUS AND COMMUNICATION SYSTEM USING A CONSTELLATION REARRANGEMENT

This is a continuation of application Ser. No. 11/003,437 filed Dec. 6, 2004, which is a continuation of application Ser. No. 10/239,794 filed Sep. 25, 2002, now U.S. Pat. No. 6,892,341 B2, issued May 10, 2005.

FIELD OF THE INVENTION

The present invention relates to a hybrid ARQ retransmission method in a communication system.

BACKGROUND OF THE INVENTION

A common technique in communication systems with unreliable and time-varying channel conditions is to correct errors based on automatic repeat request (ARQ) schemes together with a forward error correction (FEC) technique called hybrid ARQ (HARQ). If an error is detected by a commonly used cyclic redundancy check (CRC), the receiver of the communication system requests the transmitter to resend the erroneously received data packets.

S. Kaliel, *Analysis of a type II hybrid ARQ scheme with code combining*, IEEE Transactions on Communications, Vol. 38, No. 8, August 1990 and S. Kallel, R. Link, S. Bakhtiyari, *Throughput performance of Memory ARQ schemes*, IEEE Transactions on Vehicular Technology, Vol. 48, No. 3, May 1999 define three different types of ARQ schemes:

Type I: The erroneous received packets are discarded and a new copy of the same packet is retransmitted and decoded separately. There is no combining of earlier and later received versions of that packet.

Type II: The erroneous received packets are not discarded, but are combined with some incremental redundancy bits provided by the transmitter for subsequent decoding. Retransmitted packets sometimes have higher coding rates and are combined at the receiver with the stored values. That means that only little redundancy is added in each retransmission.

Type III: Is the same as Type II with the constraint each retransmitted packet is now self-decodable. This implies that the transmitted packet is decodable without the combination with previous packets. This is useful if some packets are damaged in such a way that almost no information is reusable.

Types II and III schemes are obviously more intelligent and show a performance gain with respect to Type I, because they provide the ability to reuse information from of previously received erroneous packets. There exist basically three schemes of reusing the redundancy of previously transmitted packets:

Soft-Combining
Code-Combining
Combination of Soft- and Code-Combining

Soft-Combining

Employing soft-combining the retransmission packets carry identical symbols compared with the previously received symbols. In this case the multiple, received packets are combined either by a symbol-by-symbol or by a bit-by-bit basis as for example disclosed in D. Chase, *Code combining: A maximum-likelihood decoding approach for combining an arbitrary number of noisy packets*, IEEE Trans. Commun., Vol. COM-33, pp. 385-393, May 1985 or B. A. Harvey and S. Wicker, *Packet Combining Systems based on the Viterbi Decoder*, IEEE Transactions on Communications, Vol. 42, No. 2/3/4, April 1994. By combining this soft-decision values from all received packets the reliabilities of the transmitted bits will increase linearly with the number and power of received packets. From a decoder point of view the same FEC scheme (with constant code rate) will be employed over all transmissions. Hence, the decoder does not need to know how many retransmissions have been performed, since it sees only the combined soft-decision values. In this scheme all transmitted packets will have to carry the same number of symbols.

Code-Combining

Code-combining concatenates the received packets in order to generate a new code word (decreasing code rate with increasing number of transmission). Hence, the decoder has to be aware of the FEC scheme to apply at each retransmission instant. Code-combining offers a higher flexibility with respect to soft-combining, since the length of the retransmitted packets can be altered to adapt to channel conditions. However, this requires more signaling data to be transmitted with respect to soft-combining.

Combination of Soft- and Code-Combining

In case the retransmitted packets carry some symbols identical to previously transmitted symbols and some code-symbols different from these, the identical code-symbols are combined using soft-combing as described in the section titled "Soft Combining" while the remaining code-symbols will be combined using code-combining. Here, the signaling requirements will be similar to code-combining.

As it has been shown in M. P. Schmitt, *Hybrid ARQ Scheme employing TCM and Packet Combining*, Electronics Letters Vol. 34, No. 18, September 1998 that HARQ performance for Trellis Coded Modulation (TCM) can be enhanced by rearranging the symbol constellation for the retransmissions. There, the performance gain results from the maximizing the Euclidean distances between the mapped symbols over the retransmissions, because the rearrangement has been performed on a symbol basis.

Considering high-order modulation schemes (with modulation symbols carrying more than two bits) the combining methods employing soft-combining have a major drawback: The bit reliabilities within soft-combined symbols will be in a constant ratio over all retransmissions, i.e. bits which have been less reliable from previous received transmissions will still be less reliable after having received further transmissions and, analogous, bits which have been more reliable from previous received transmissions will still be more reliable after having received further transmissions.

The varying bit reliabilities evolve from the constraint of two-dimensional signal constellation mapping, where modulation schemes carrying more than 2 bits per symbol cannot have the same mean reliabilities for all bits under the assumption that all symbols are transmitted equally likely. The term mean reliabilities is consequently meant as the reliability of a particular bit over all symbols of a signal constellation.

Figure 1:
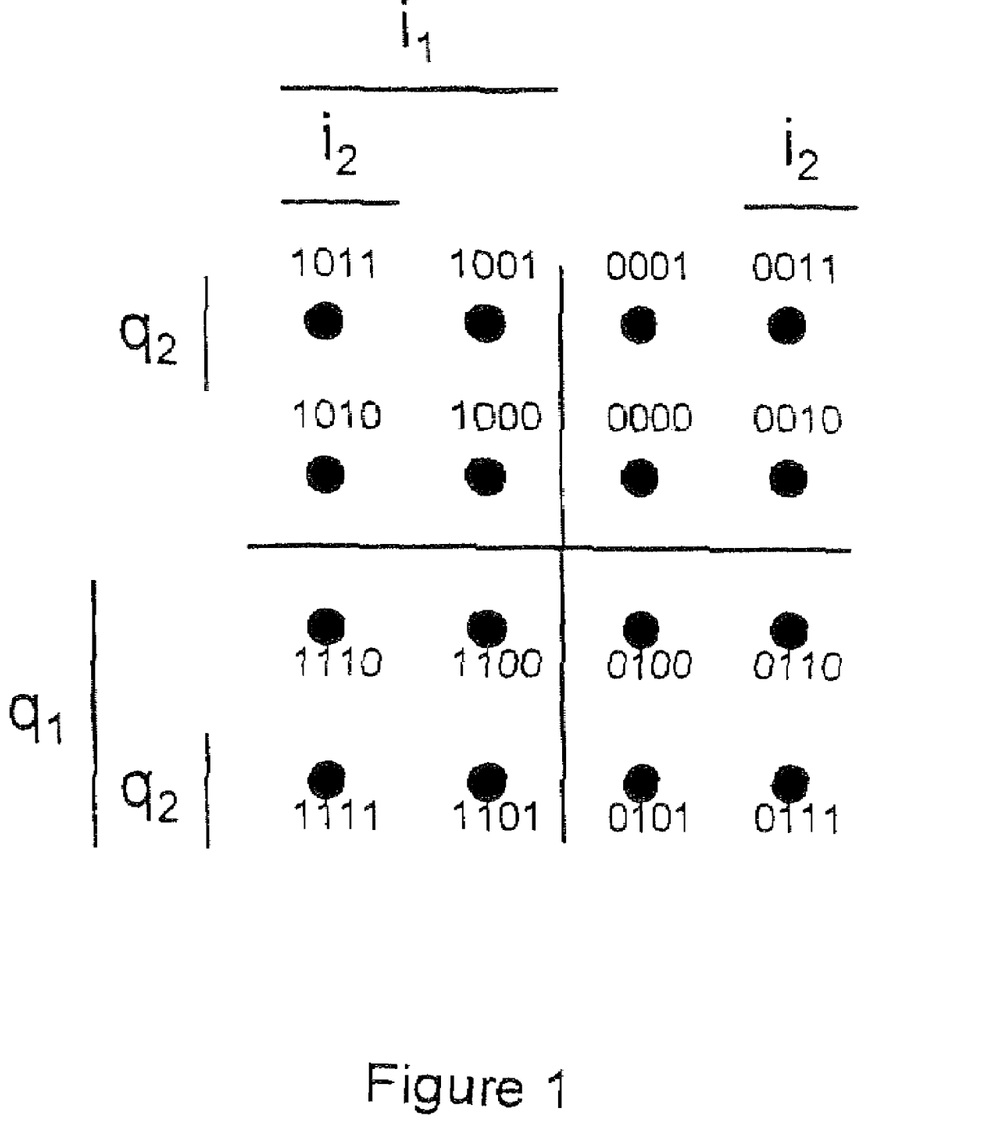
FIG. 1 is an exemplary signal constellation for illustrating a 16 QAM modulation scheme with Gray encoded bit symbols.

Employing a signal constellation for a 16 QAM modulation scheme according to FIG. 1 showing a Gray encoded signal constellation with a given bit-mapping order $i_1 q_1 i_2 q_2$, the bits mapped onto the symbols differ from each other in mean reliability in the first transmission of the packet. In more detail, bits $i_1$ and $q_1$ have a high mean reliability, as these bits are mapped to half spaces of the signal constellation diagram with the consequences that their reliability is independent from the fact of whether the bit transmits a one or a zero.

In contrast thereto, bits $i_2$ and $q_2$ have a low mean reliability, as their reliability depends on the fact of whether they transmit a one or a zero. For example, for bit $i_2$, ones are mapped to outer columns, whereas zeros are mapped to inner columns. Similarly, for bit $q_2$, ones are mapped to outer rows, whereas zeros are mapped to inner rows.

For the second and each further retransmissions the bit reliabilities will stay in a constant ratio to each other, which is defined by the signal constellation employed in the first transmission, i.e. bits $i_1$ and $q_1$ will always have a higher mean reliability than bits $i_2$ and $q_2$ after any number of retransmissions.

SUMMARY OF THE INVENTION

The object underlying the present invention is to provide a hybrid ARQ retransmission method with an improved error correction performance. This object is solved by a method as set forth in claim 1.

The method subject to the invention is based on the recognition that in order to enhance the decoder performance, it would be quite beneficial to have equal or near to equal mean bit reliabilities after each received transmission of a packet. Hence, the idea underlying the invention is to tailor the bit reliabilities over the retransmissions in a way that the mean bit reliabilities get averaged out. This is achieved by choosing a predetermined first and at least second signal constellation for the transmissions, such that the combined mean bit reliabilities for the respective bits of all transmissions are nearly equal.

Hence, the signal constellation rearrangement results in a changed bit mapping, wherein the Euclidean distances between the modulation symbols can be altered from retransmission to retransmission due to the movement of the constellation points. As a result, the mean bit reliabilities can be manipulated in a desired manner and averaged out to increase the performance the FEC decoder at the receiver.

BRIEF DESCRIPTION OF THE DRAWINGS

For a more in depth understanding of the present invention, preferred embodiments will be described in the following with reference to the accompanying drawings.

DETAILED DESCRIPTION OF EMBODIMENTS

For a better understanding of the embodiments, in the following the concept of a Log-Likelihood-Ratio (LLR) will be described as a metric for the bit reliabilities. First the straight forward calculation of the bit LLRs within the mapped symbols for a single transmission will be shown. Then the LLR calculation will be extended to the multiple transmission case.

Single Transmission

The mean LLR of the i-th bit $b_n^i$ under the constraint that symbol $s_n$ has been transmitted for a transmission over a channel with additive white gaussian noise (AWGN) and equally likely symbols yields $$LLR_{b_n^i | r_n}(r_n) = \log\left[\sum_{(m|b_m^i = b_n^i)} e^{-\frac{E_S}{N_0} \cdot d_{n,m}^2}\right] - \log\left[\sum_{(m|b_m^i \neq b_n^i)} e^{-\frac{E_S}{N_0} \cdot d_{n,m}^2}\right], \quad (1)$$

where $r_n = s_n$ denotes the mean received symbol under the constraint the symbol $s_n$ has been transmitted (AWGN case), $d_{n,m}^2$ denotes the square of the Euclidean distance between the received symbol $r_n$ and the symbol $s_m$, and $E_S/N_0$ denotes the observed signal-to-noise ratio.

It can be seen from Equation (1) that the LLR depends on the signal-to-noise ratio $E_S/N_0$ and the Euclidean distances $d_{n,m}$ between the signal constellation points.

Multiple Transmissions

Considering multiple transmissions the mean LLR after the k-th transmission of the i-th bit $b_n^i$ under the constraint that symbols $s_n^{(j)}$ have been transmitted over independent AWGN channels and equally likely symbols yields $$LLR_{b_n^i | \bigcap_{j=1}^k r_n^i}(r_n^{(1)}, r_n^{(2)}, \ldots, r_n^{(k)}) = \quad (2)$$

$$\log\left[\sum_{(m|b_m^i = b_n^i)} e^{-\sum_{j=1}^k \left(\frac{E_S}{N_0}\right)^{(j)} \cdot \left(d_{n,m}^{(j)}\right)^2}\right] - $$

$$\log\left[\sum_{(m|b_m^i \neq b_n^i)} e^{-\sum_{j=1}^k \left(\frac{E_S}{N_0}\right)^{(j)} \cdot \left(d_{n,m}^{(j)}\right)^2}\right],$$

where j denotes the j-th transmission ((j−1)-th retransmission). Analogous to the single transmission case the mean LLRs depend on the signal-to-noise ratios and the Euclidean distances at each transmission time.

If no constellation rearrangement is performed the Euclidean distances $d_{n,m}^{(j)} = d_{n,m}^{(1)}$ are constant for all transmissions and, hence, the bit reliabilities (LLRs) after k transmissions will be defined by the observed signal-to-noise ratio at each transmission time and the signal constellation points from the first transmission. For higher level modulation schemes (more than 2 bits per symbol) this results in varying mean LLRs for the bits, which in turn leads to different mean bit reliabilities. The differences in mean reliabilities remain over all retransmissions and lead to a degradation in decoder performance.

16-QAM Strategy

In the following, the case of a 16-QAM system will be exemplarily considered resulting in 2 high reliable and 2 low reliable bits, where for the low reliable bits the reliability depends on transmitting a one or a zero (see FIG. 1). Hence, overall there exist 3 levels of reliabilities.

Level 1 (High Reliability, 2 bits): Bit mapping for ones (zeros) separated into the positive (negative) real half space for the i-bits and the imaginary half space the q-bits. Here, there is no difference whether the ones are mapped to the positive or to the negative half space.

Level 2 (Low Reliability, 2 bits): Ones (zeros) are mapped to inner (outer) columns for the i-bits or to inner (outer) rows for the q-bits. Since there is a difference for the LLR depending on the mapping to the inner (outer) columns and rows, Level 2 is further classified:

Level 2a: Mapping of $i_n$ to inner columns and $q_n$ to inner rows respectively.

Level 2b: Inverted mapping of Level 2a: Mapping of $i_n$ to outer columns and $q_n$ to outer rows respectively.

To ensure an optimal averaging process over the transmissions for all bits the levels of reliabilities have to be altered by changing the signal constellations according to the algorithms given in the following section.

It has to be considered that the bit-mapping order is open prior initial transmission, but has to remain through retransmissions, e.g. bit-mapping for initial transmission: $i_1 q_1 i_2 q_2$ ⇒bit-mapping all retransmissions: $i_1 q_1 i_2 q_2$.

Figure 2:
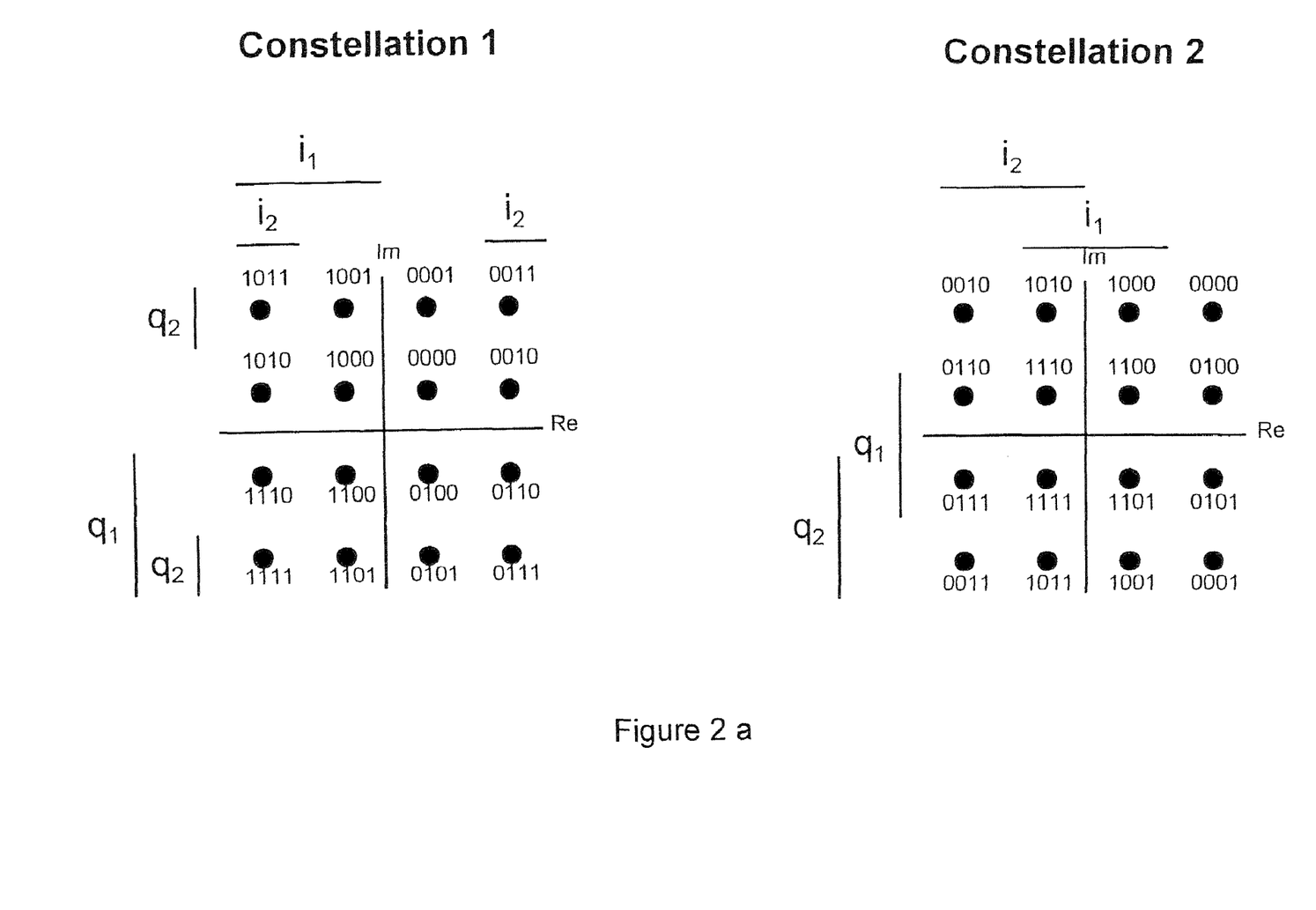
FIG. 2 shows four examples for signal constellations for a 16 QAM modulation scheme with Gray encoded bit symbols.

For the actual system implementation there are a number of possible signal constellations to achieve the averaging process over the retransmissions. Some examples for possible constellations are shown in FIG. 2. The resulting bit reliabilities according to FIG. 2 are given in Table 1.

TABLE 1

Bit reliabilities for 16-QAM according to signal constellations shown in FIG. 2

| Constellation | bit $i_1$ | bit $q_1$ | bit $i_2$ | bit $q_2$ |
|---|---|---|---|---|
| 1 | High Reliability (Level 1) | High Reliability (Level 1) | Low Reliability (Level 2b) | Low Reliability (Level 2b) |
| 2 | Low Reliability (Level 2a) | Low Reliability (Level 2a) | High Reliability (Level 1) | High Reliability (Level 1) |
| 3 | Low Reliability (Level 2b) | Low Reliability (Level 2b) | High Reliability (Level 1) | High Reliability (Level 1) |
| 4 | High Reliability (Level 1) | High Reliability (Level 1) | Low Reliability (Level 2a) | Low Reliability (Level 2a) |

Moreover, Table 2 provides some examples how to combine the constellations for the transmissions 1 to 4 (using 4 different mappings).

TABLE 2

Examples for Constellation Rearrangement strategies for 16-QAM (using 4 mappings) with signal constellations according to FIG. 2 and bit reliabilities according to Table 1.

| Transmission No. | Scheme 1 (with Constellations) | Scheme 2 (with Constellations) | Scheme 3 (with Constellations) | Scheme 4 (with Constellations) |
|---|---|---|---|---|
| 1 | 1 | 1 | 1 | 1 |
| 2 | 2 | 2 | 3 | 3 |
| 3 | 3 | 4 | 2 | 4 |
| 4 | 4 | 3 | 4 | 2 |

Two algorithms are given which describe schemes using 2 or 4 mappings overall. The approach using 2 mappings results in less system complexity, however has some performance degradation with respect to the approach using 4 mappings. The mapping for i- and q-bits can be done independently and, hence, in the following the mapping for the i-bits only is described. The algorithms for the q-bits work analog.

16-QAM Algorithms

A. Using 2 Mappings

1. Step (1. Transmission)

Choose Level 1 for $i_1$ ⇒Level 2 for $i_2$—free choice if 2a or 2b

⇒1. Mapping Defined

2. Step (2. Transmission)

Choose Level 1 for $i_2$ ⇒Level 2 for $i_1$—free choice if 2a or 2b

⇒2. Mapping Defined

3. Step

Options:

(a) Go to 1. Step and proceed with alternating between 1. and 2. Mapping (b) Use 2. Mapping and proceed with using 2 times 1. Mapping, 2 times 2. Mapping and so on . . .

B. Using 4 Mappings

1. Step (1. Transmission)

Choose Level 1 for $i_1$ ⇒Level 2 for $i_2$—free choice if 2a or 2b

⇒1. Mapping Defined

2. Step (2. Transmission)

Choose Level 1 for $i_2$ ⇒Level 2 for $i_1$—free choice if 2a or 2b

⇒2. Mapping Defined

3. Step (3. Transmission)

Options:
    (a) Choose Level 1 for $i_1$ ⇒Level 2 for $i_2$ with following options
        (a1) if in 1. Transmission 2a was used then use 2b
        (a2) if in 1. Transmission 2b was used then use 2a
    (b) Choose Level 1 for $i_2$ ⇒Level 2 for $i_1$ with following options
        (b1) if in 2. Transmission 2a was used then use 2b
        (b2) if in 2. Transmission 2b was used then use 2a ⇒3. Mapping Defined 4, Step (4. Transmission)

if option (a) in 3. Step
    Choose Level 1 for $i_2$ ⇒Level 2 for $i_1$ with following options
        (a1) if in 2. Transmission 2a was used then use 2b
        (a2) if in 2. Transmission 2b was used then use 2a if option (b) in 3. Step
    Choose Level 1 for $i_1$ ⇒Level 2 for $i_2$ with following options
        (a1) if in 1. Transmission 2a was used then use 2b
        (a2) if in 1. Transmission 2b was used then use 2a ⇒4. Mapping Defined 5. Step (5., 9., 13., . . . Transmission)

Choose one out of 4 defined mappings

6. Step (6., 10., 14., . . . Transmission)

Choose one out of 4 defined mappings except
    (a) the mapping used in 5. Step (previous transmission)
    (b) the mapping giving Level 1 reliability to the same bit as in previous transmission 7. Step (7., 11., 15., . . . Transmission)

Choose one out of 2 remaining mappings not used in last 2 transmissions

8. Step (8., 12., 16., . . . Transmission)

Choose mapping not used in last 3 transmissions

9. Step

Go to 5. Step

64-QAM Strategy

Figure 3:
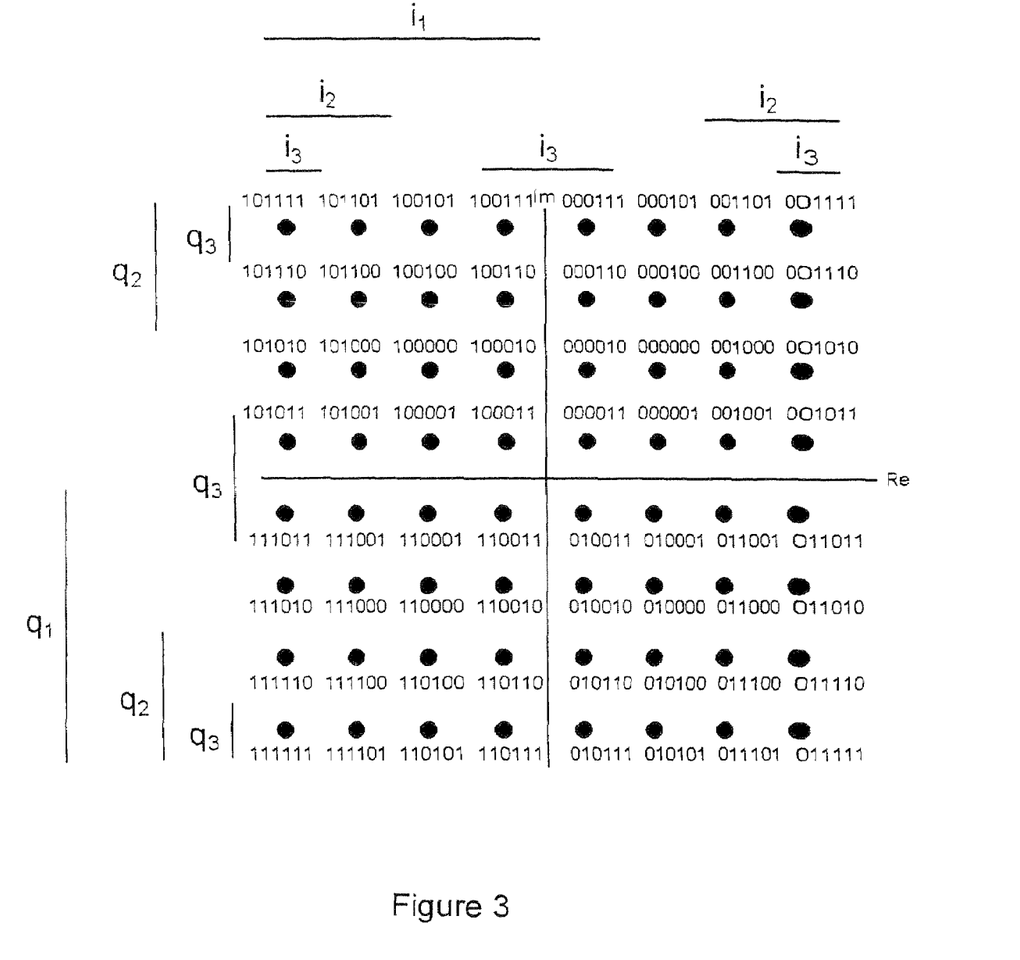
FIG. 3 shows an exemplary signal constellation for 64-QAM Gray encoded bit symbols.

In case of a 64-QAM system there will be 2 high reliable, 2 medium reliable and 2 low reliable bits, where for the low and medium reliable bits the reliability depends on transmitting a one or a zero (see FIG. 3). Hence, overall there exist 5 levels of reliabilities.

Level 1 (High Reliability, 2 bits): Bit mapping for ones (zeros) separated into the positive (negative) real half space for the i-bits and the imaginary half space for the q-bits. Here, there is no difference whether the ones are mapped to the positive or to the negative half space.

Level 2 (Medium Reliability, 2 bits): Ones (zeros) are mapped to 4 inner and 2×2 outer columns for the i-bits or to 4 inner and 2×2 outer rows for the q-bits. Since there is a difference for the LLR depending on the mapping to the inner or outer column/row Level 2 is further classified:

Level 2a: Mapping of $i_n$ to 4 inner columns and $q_n$ to 4 inner rows respectively.

Level 2b: Inverted mapping of 2a: $i_n$ to outer columns and $q_n$ to outer rows respectively Level 3 (Low Reliability, 2 bits): Ones (zeros) are mapped to columns 1-4-5-8/2-3-6-7 for the i-bits or to rows 1-4-5-8/2-3-6-7 for the q-bits. Since there is a difference for the LLR depending on the mapping to columns/rows 1-4-5-8 or 2-3-6-7 Level 3 is further classified:

Level 3a: Mapping of $i_n$ to columns 2-3-6-7 and $q_n$ to rows 2-3-6-7 respectively Level 3b: Inverted mapping of 2a: $i_n$ to columns 1-4-5-8 and $q_n$ to rows 1-4-5-8 respectively To ensure an optimal averaging process over the transmissions for all bits the levels of reliabilities have to be altered by changing the signal constellations according to the algorithms given in the following section.

It has to be considered that the bit-mapping order is open prior initial transmission, but has to remain through retransmissions, e.g. bit-mapping for initial transmission:

$i_1 q_1 i_2 q_2 i_3 q_3$ ⇒bit-mapping all retransmissions: $i_1 q_1 i_2 q_2 i_3 q_3$.

Figure 4:
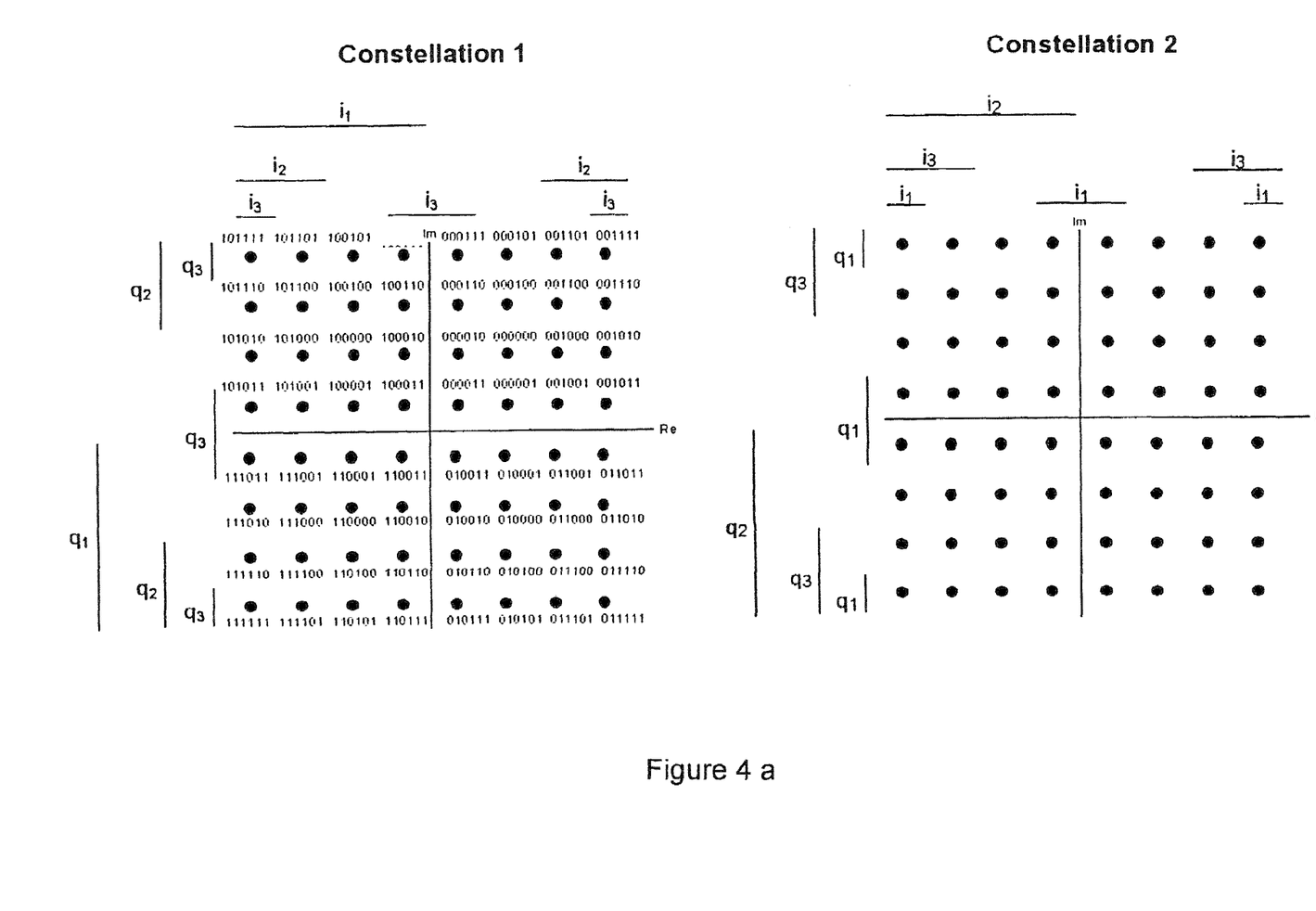
FIG. 4 shows six exemplary signal constellations for 64-QAM Gray encoded bit symbols

Analog to 16-QAM for the actual system implementation there are a number of possible signal constellations to achieve the averaging process over the retransmissions. Some examples for possible constellations are shown in FIG. 4. The resulting bit reliabilities according to FIG. 4 are given in Table 3.

Moreover Table 4 provides some examples how to combine the constellations for the transmissions 1 to 6 (using 6 different mappings).

TABLE 4

Examples for Constellation Rearrangement strategies for 64-QAM (using 6 mappings) with signal constellations according to FIG. 4 and bit reliabilities according to Table 3.

| Transmission No. | Scheme 1 (with Constellations) | Scheme 2 (with Constellations) | Scheme 3 (with Constellations) | Scheme 4 (with Constellations) |
|---|---|---|---|---|
| 1 | 1 | 1 | 1 | 1 |
| 2 | 2 | 3 | 5 | 3 |
| 3 | 3 | 2 | 6 | 2 |
| 4 | 4 | 4 | 4 | 6 |
| 5 | 5 | 5 | 2 | 5 |
| 6 | 6 | 6 | 3 | 4 |

Two algorithms are given which describe schemes using 3 or 6 mappings overall. The approach using 3 mappings results in less system complexity, however has some performance degradation with respect to the approach using 6 mappings. The mapping for i- and q-bits can be done independently and, hence, in the following the mapping for the i-bits only is described. The algorithms for the q-bits work analog.

64-QAM Algorithms

A. Using 3 Mappings

1. Step (1. Transmission)

1. Step (1. Transmission)

Choose Level 1 for $i_1$

Choose Level 2 for $i_2$ (free choice if 2a or 2b)⇒Level 3 for $i_3$—free choice if 3a or 3b ⇒1. Mapping Defined 2. Step (2. Transmission)

Options:

(a) Choose Level 1 for $i_2$

Choose Level 2 for $i_3$ (free choice if 2a or 2b)⇒Level 3 for $i_1$—free choice if 3a or 3b

TABLE 3

Bit reliabilities for 64-QAM according to signal constellations shown in FIG. 4.

| Constellation | bit $i_1$ | bit $q_1$ | bit $i_2$ | bit $q_2$ | bit $i_3$ | bit $q_3$ |
|---|---|---|---|---|---|---|
| 1 | High Reliability (Level 1) | High Reliability (Level 1) | Middle Reliability (Level 2b) | Middle Reliability (Level 2b) | Low Reliability (Level 3b) | Low Reliability (Level 3b) |
| 2 | Low Reliability (Level 3b) | Low Reliability (Level 3b) | High Reliability (Level 1) | High Reliability (Level 1) | Middle Reliability (Level 2b) | Middle Reliability (Level 2b) |
| 3 | Middle Reliability (Level 2b) | Middle Reliability (Level 2b) | Low Reliability (Level 3b) | Low Reliability (Level 3b) | High Reliability (Level 1) | High Reliability (Level 1) |
| 4 | High Reliability (Level 1) | High Reliability (Level 1) | Middle Reliability (Level 2a) | Middle Reliability (Level 2a) | Low Reliability (Level 3a) | Low Reliability (Level 3a) |
| 5 | Low Reliability (Level 3a) | Low Reliability (Level 3a) | High Reliability (Level 1) | High Reliability (Level 1) | Middle Reliability (Level 2a) | Middle Reliability (Level 2a) |
| 6 | Middle Reliability (Level 2a) | Middle Reliability (Level 2a) | Low Reliability (Level 3a) | Low Reliability (Level 3a) | High Reliability (Level 1) | High Reliability (Level 1) |

(b) Choose Level 1 for $i_3$

Choose Level 2 for $i_1$ (free choice if 2a or 2b) ⇒ Level 3 for $i_2$—free choice if 3a or 3b ⇒2. Mapping Defined 3. Step (3. Transmission)

if (a) in 2. Step

Choose Level 1 for $i_3$

Choose Level 2 for $i_1$ (free choice if 2a or 2b) ⇒ Level 3 for $i_2$—free choice if 3a or 3b if (b) in 2. Step Choose Level 1 for $i_2$ Choose Level 2 for $i_3$ (free choice if 2a or 2b) ⇒ Level 3 for $i_1$—free choice if 3a or 3b ⇒3. Mapping Defined 4. Step (4., 7., 10., . . . Transmission)

Choose one out of 3 defined mappings

5. Step (5., 8., 11., . . . Transmission)

Choose one out of 3 defined mappings except the mapping used in previous transmission 6. Step (6., 9., 12., . . . Transmission)

Choose one out of 3 defined mappings except the mapping used in last 2 transmissions 7. Step Go to 4. Step B. Using 6 Mappings 1. Step (1. Transmission)

Choose Level 1 for $i_1$

Choose Level 2 for $i_2$ (free choice if 2a or 2b) ⇒ Level 3 for $i_3$—free choice if 3a or 3b ⇒1. Mapping Defined 2. Step (2. Transmission)

Options:

(a) Choose Level 1 for $i_2$

Choose Level 2 for $i_3$ (free choice if 2a or 2b) ⇒ Level 3 for $i_1$—free choice if 3a or 3b (b) Choose Level 1 for $i_3$ Choose Level 2 for $i_1$ (free choice if 2a or 2b) ⇒ Level 3 for $i_2$—free choice if 3a or 3b ⇒2. Mapping Defined 3. Step (3. Transmission)

if (a) in 2. Step

Choose Level 1 for $i_3$

Choose Level 2 for $i_1$ (free choice if 2a or 2b) ⇒ Level 3 for $i_2$—free choice if 3a or 3b if (b) in 2. Step Choose Level 1 for $i_2$ Choose Level 2 for $i_3$ (free choice if 2a or 2b) ⇒ Level 3 for $i_1$—free choice if 3a or 3b ⇒3. Mapping Defined 4. Step (4. Transmission)

Choose Level 1 for one bit out of $i_1$, $i_2$ or $i_3$

Choose Level 2 for one out of two remaining bits with following restrictions
   (a1) if in one of the previous transmission 2a was used for this bit then use 2b
   (a2) if in one of the previous transmission 2b was used for this bit then use 2a ⇒Level 3 for remaining bit with following restrictions
   (b1) if in one of the previous transmission 3a was used for this bit then use 3b
   (b2) if in one of the previous transmission 3b was used for this bit then use 3a ⇒4. Mapping Defined 5. Step (5. Transmission)

Choose Level 1 for one out of two bits not having Level 1 in 4. Step Choose Level 2 for one out of two bits not having Level 2 in 4. Step with following restrictions
   (a1) if in one of the previous transmission 2a was used for this bit then use 2b
   (a2) if in one of the previous transmission 2b was used for this bit then use 2a ⇒Level 3 for remaining bit with following restrictions
   (b1) if in one of the previous transmission 3a was used for this bit then use 3b
   (b2) if in one of the previous transmission 3b was used for this bit then use 3a ⇒5. Mapping Defined 6. Step (6. Transmission)

Choose Level 1 for bit not having Level 1 in 4. Step and 5. Step

Choose Level 2 for bit not having Level 2 in 4. Step and 5. Step with following restrictions
   (a1) if in one of the previous transmission 2a was used for this bit then use 2b
   (a2) if in one of the previous transmission 2b was used for this bit then use 2a ⇒Level 3 for remaining bit with following restrictions
   (b1) if in one of the previous transmission 3a was used for this bit then use 3b
   (b2) if in one of the previous transmission 3b was used for this bit then use 3a ⇒6. Mapping Defined 7. Step (7., 13., 19., . . . Transmission)

Choose one out of 6 defined mappings

8. Step (8., 14., 20., . . . Transmission)

Choose one out of 6 defined mappings except
   (a) the mapping used in 7. Step (previous transmission)
   (b) the mapping giving Level 1 reliability to the same bit as in previous transmission 9. Step (9., 15., 21., . . . Transmission)

Choose one out of 6 defined mappings with giving Level 1 reliability to the bit not having Level 1 in last 2 transmissions 10. Step (10., 16., 22., . . . Transmission)

Choose one out of 3 remaining mappings not used in last 3 transmissions

11. Step (11., 17., 23., . . . Transmission)

Choose one out of 2 remaining mappings not used in last 4 transmissions

12. Step (12., 18., 24., . . . Transmission)

Choose remaining mapping not used in last 5 transmissions

13. Step

Go to 7. Step

Figure 5:
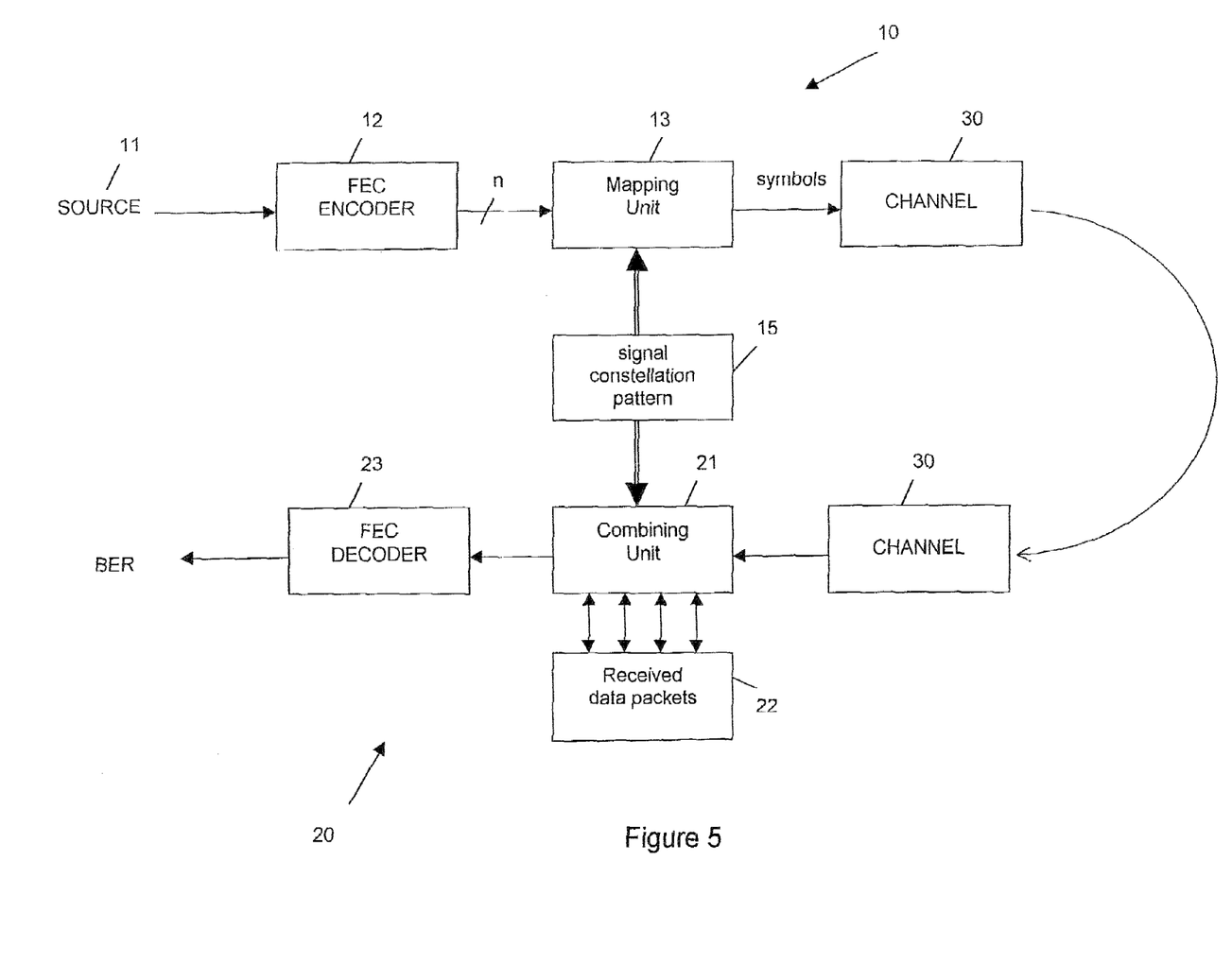
FIG. 5 is an exemplary embodiment of a communication system in which the method underlying the invention is employed, and FIG. 6 explains details of the mapping unit shown in FIG. 5.

FIG. 5 shows an exemplary embodiment of a communication system to which the present invention can be applied. More specifically, the communication system comprises a transmitter 10 and a receiver 20 which communicate through a channel 30 which can either be wire-bound or wireless, i.e. an air inteface. From a data source 11, data packets are supplied to a FEC encoder 12, where redundancy bits are added to correct errors. The n bits output from the FEC decoder are subsequently supplied to a mapping unit 13 acting as a modulator to output symbols formed according to the applied modulation scheme stored as a constellation pattern in a table 15. Upon transmission over the channel 30, the receiver 20 checks the received data packets, for example, by means of a cyclic redundancy check (CRC) for correctness.

If the received data packets are erroneous, the same are stored in a temporary buffer 22 for subsequent soft combining with the retransmitted data packets.

A retransmission is launched by an automatic repeat request issued by an error detector (not shown) with the result that an identical data packet is transmitted from the transmitter 10. In the combining unit 21, the previously received erroneous data packets are soft-combined with the retransmitted data packets. The combining unit 21 also acts as a demodulator and the same signal constellation pattern stored in the table 15 is used to demodulate the symbol which was used during the modulation of that symbol.

Figure 6:
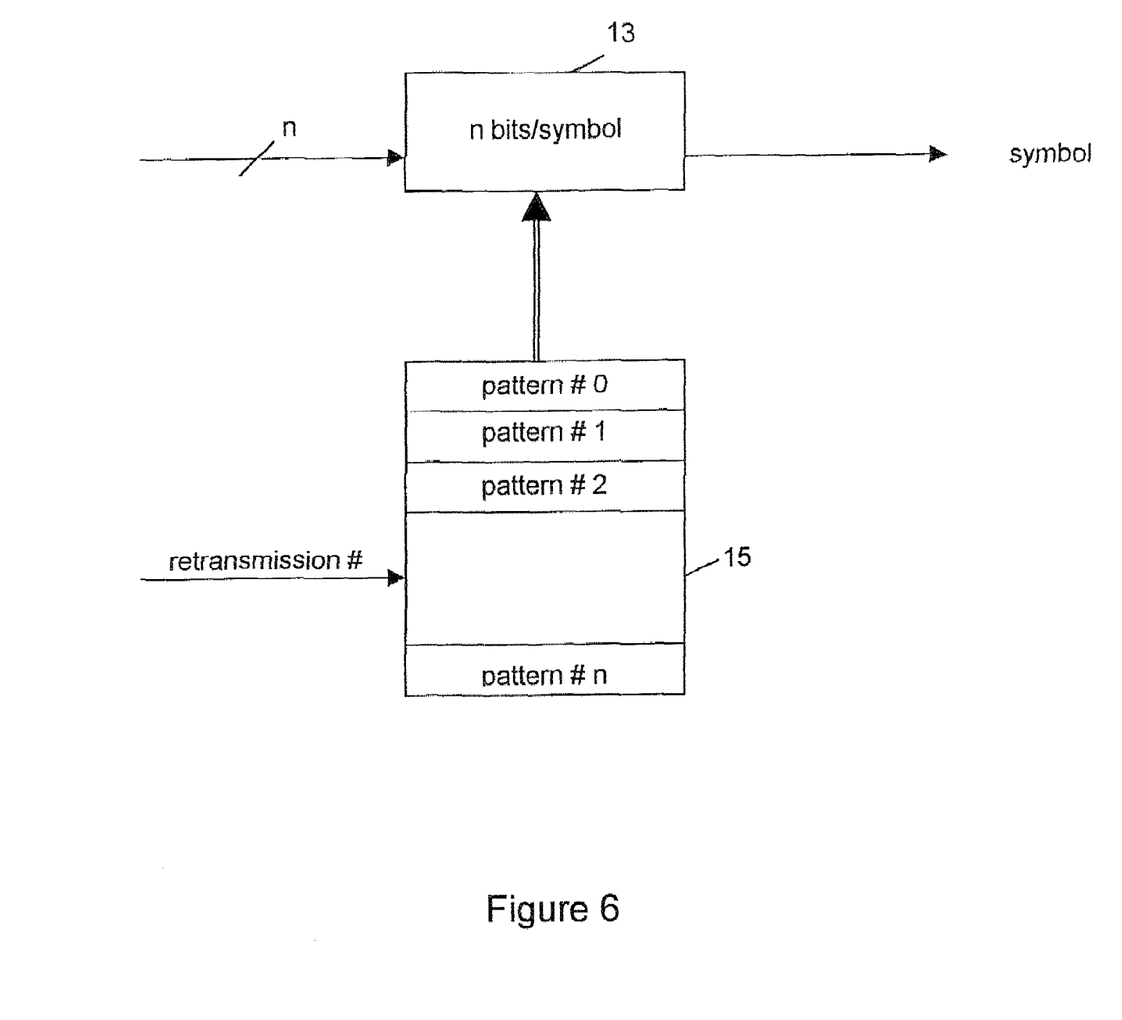

As illustrated in FIG. 6, the table 15 stores a plurality of signal constellation patterns which are selected for the individual (re)-transmissions according to a predetermined scheme. The scheme, i.e. the sequence of signal constellation patterns used for modulating/demodulating are either pre-stored in the transmitter and the receiver or are signaled by transmitter to the receiver prior to usage.

As mentioned before, the method underlying the invention rearranges the signal constellation patterns for the individual (re)-transmissions according to a predetermined scheme, such that the mean bit reliabilities are averaged out. Hence, the performance of the FEC decoder 23 is significantly improved, resulting in a low bit error rate (BER) output from the decoder.

What is claimed is:

1. A transmission apparatus for transmitting data comprising:
   a table that includes a plurality of constellation versions for a 64 QAM modulation scheme, one of the constellation versions is produced by, with respect to a bit sequence $(i_1 q_1 i_2 q_2 i_3 q_3)$, at least one of (i) shifting bit positions to a bit sequence $(i_2 q_2 i_3 q_3 i_1 q_1)$, (ii) inverting logical values of $i_2$ and $q_2$ and (iii) inverting logical values of $i_3$ and $q_3$;
   a modulation section that modulates data into a 64 QAM symbol based on one of the constellation versions; and
   a transmission section that transmits the modulated data to a reception apparatus.

2. A transmission apparatus according to claim 1, wherein said table includes (i) a constellation version indicating a bit sequence $(i_1 q_1 i_2 q_2 i_3 q_3)$, (ii) the constellation version indicating the shifted bit sequence $(i_2 q_2 i_3 q_3 i_1 q_1)$, (iii) the constellation version produced by inverting logical values of $i_2$ and $q_2$ of the bit sequence $(i_1 q_1 i_2 q_2 i_3 q_3)$, and (iv) the constellation version produced by inverting logical values of $i_3$ and $q_3$ of the bit sequence $(i_1 q_1 i_2 q_2 i_3 q_3)$.

3. A transmission apparatus according to claim 1, further comprising a selecting section that selects one of the constellation versions.

4. A transmission apparatus according to claim 1, further comprising a constellation rearrangement section that performs a constellation rearrangement using one of the constellation versions.

5. A transmission apparatus according to claim 1, wherein:
   said modulation section (i) modulates first data into a 64 QAM symbol based on one of the constellation versions and (ii) modulates second data into a 64 QAM symbol based on another constellation version of the constellation versions, and
   said transmission section (i) transmits the modulated first data and (ii) transmits the modulated second data.

6. A transmission apparatus according to claim 1, wherein said transmission section transmits information indicating the constellation version used for transmitting the modulated data to the reception apparatus.

7. A transmission apparatus according to claim 1, wherein:
   said modulation section (i) modulates first data into a 64 QAM symbol based on one of the constellation versions in a first transmission and (ii) modulates second data into a 64 QAM symbol based on another constellation version of the constellation versions in a retransmission, and
   said transmission section (i) transmits the modulated first data in the first transmission and (ii) transmits the modulated second data in the retransmission.

* * * * *